United States Patent [19]
Sjovall

[11] 3,874,469
[45] Apr. 1, 1975

[54] AGRICULTURAL MACHINE

[75] Inventor: Stig Lennart Sjovall, Kavlinge, Sweden

[73] Assignee: Svenska Sockerfabriks AB, Malmo, Sweden

[22] Filed: May 15, 1973

[21] Appl. No.: 360,497

[30] Foreign Application Priority Data
May 17, 1972 Sweden.............................. 6428/72

[52] U.S. Cl............... 180/12, 180/14 R, 180/24.02, 172/273, 172/298
[51] Int. Cl............................................. B60k 55/00
[58] Field of Search............ 172/273, 780, 781, 297, 172/298, 671, 776; 180/89 R, 12, 14, 24.02

[56] References Cited
UNITED STATES PATENTS

| | | | |
|---|---|---|---|
| 3,087,296 | 4/1963 | Cowles | 56/25.4 |
| 3,450,213 | 6/1969 | Creighton et al. | 172/781 X |
| 3,462,925 | 8/1969 | Lanier | 56/25.4 |
| 3,680,563 | 8/1972 | Murata et al. | 180/89 R X |
| 3,726,346 | 4/1973 | Thompson et al. | 172/272 |

Primary Examiner—Stephen C. Pellegrino
Attorney, Agent, or Firm—Browne, Beveridge, DeGrandi & Kline

[57] ABSTRACT

Agricultural machine having a frame supported by driving wheels and supporting wheels, said frame having a main part arranged in the longitudinal direction of the machine so as to extend from the region of the driver's station in the machine, preferably from the upper side thereof, over coupling means for agricultural implements and to a unit including the supporting wheels and coupling means of the machine. Said agricultural machine includes a driver's station lodged in a cabin immediately before the driving wheel axle. To permit coupling and uncoupling of working implements said agricultural machine is adapted to pivot about the driving wheel axle whereby said machine resting on the driving wheels and on wheels mounted in the free ends of hydraulically operated swinging arms can be run with the supporting wheels lifted up over the working implement which, after the said machine has swung back to normal position, is coupled to the coupling means between the driving wheels and the supporting wheels.

9 Claims, 4 Drawing Figures

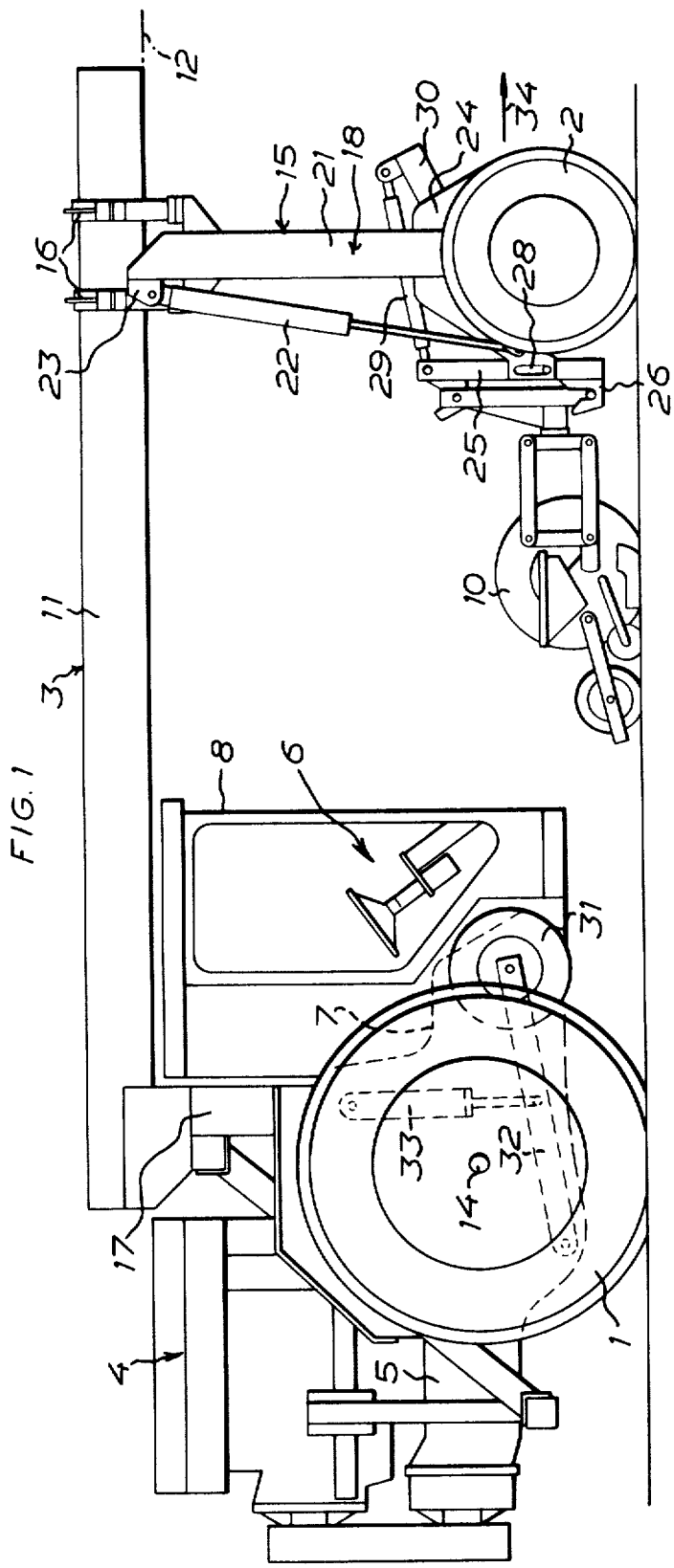

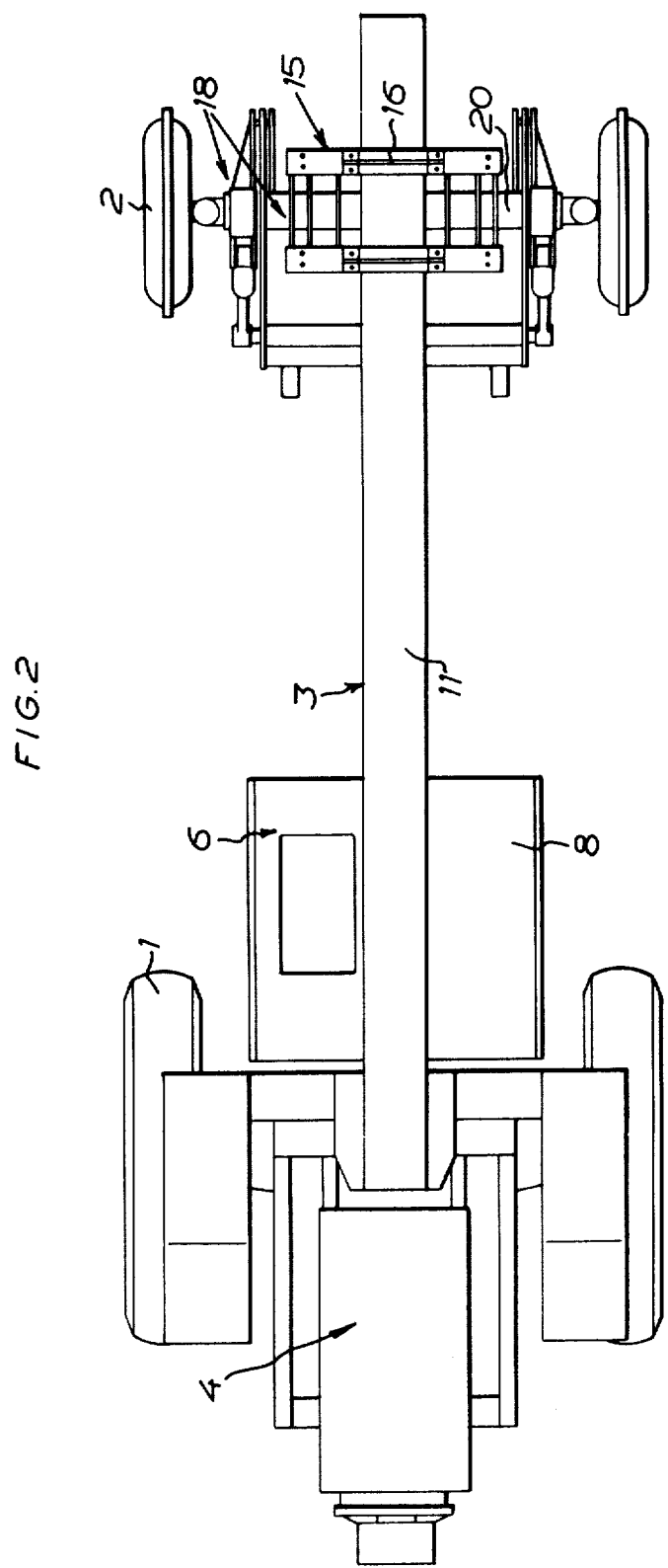

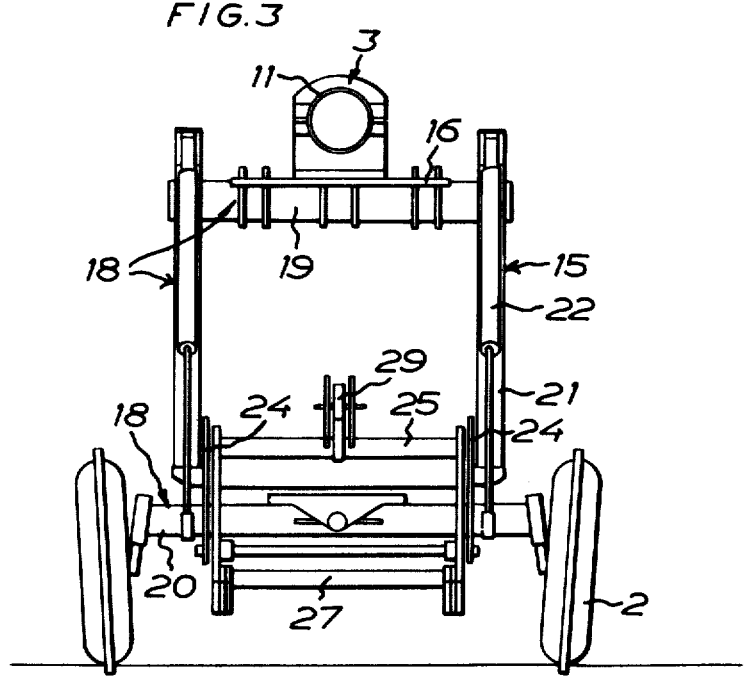

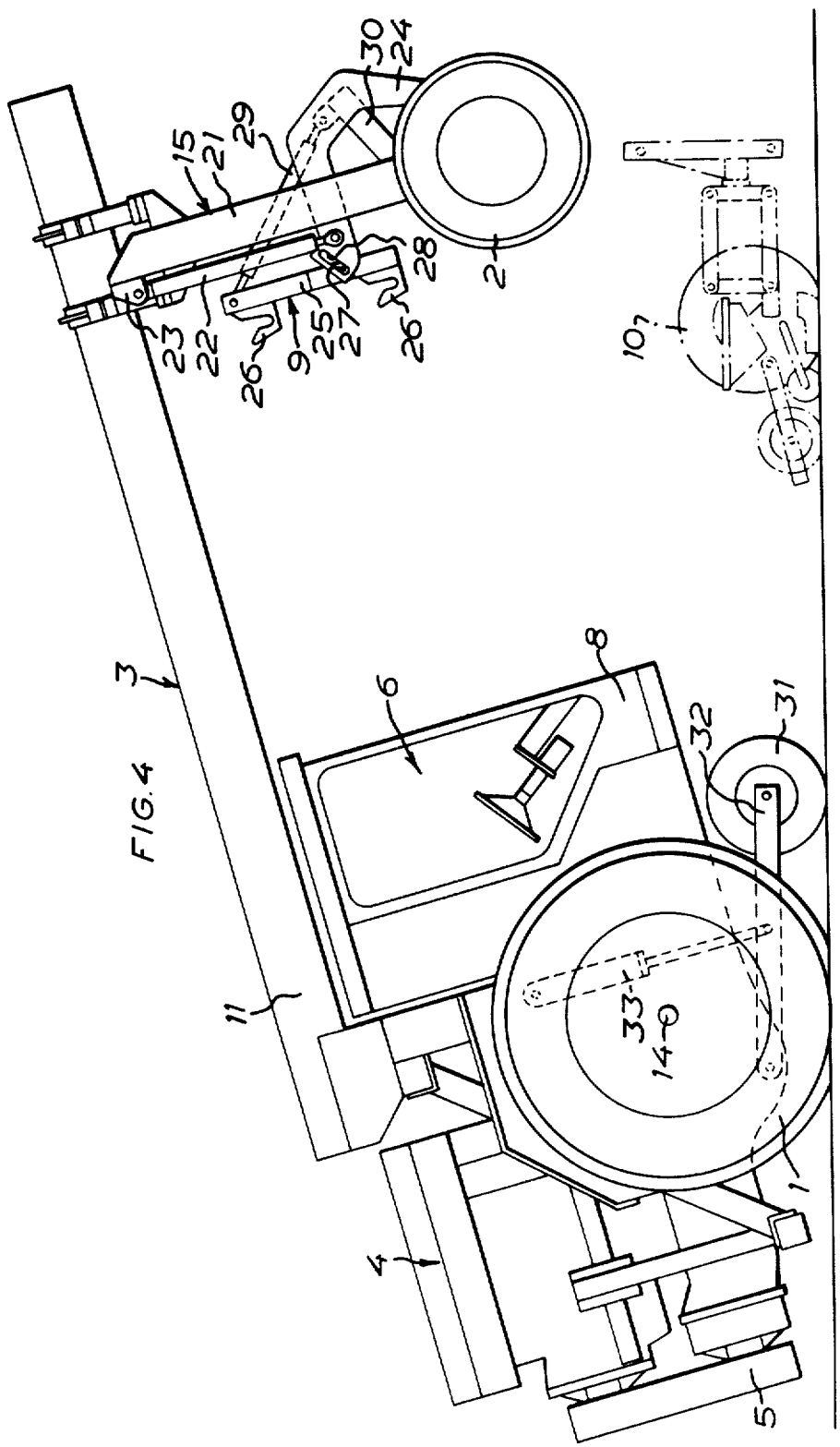

AGRICULTURAL MACHINE

The present invention relates to an agricultural machine having a frame supported by driving wheels and supporting wheels, a driving unit coupled to the driving wheels, which is controllable together with the machine from a driver's station in the machine, and also, arranged between the driving and supporting wheels, coupling means for agricultural implements.

A difficult problem in all kinds of agricultural machines, especially the machines and implements drawn or carried by tractors, arises when trying to give the driver an unobstructed and convenient view of the working area of the machine or implement, considering the fact that for economical reasons the machine or implement should nowadays be operated by only one person. In agriculture it is also endeavoured to restrict the machinery investment cost and to produce machines, for instance in the form of agricultural implement carriers, which permit obtaining a satisfactory survey of the working area and can be used for various kinds of implements to operate individually or by groups. So far these efforts have not succeeded and an all-purpose machine making it possible to survey the working area is still called for. To get an at least almost acceptable survey of the working area the driver must as a rule take an uncomfortable position of driving which leads to inferior working results and often is unhealthy and full of risks. To facilitate the driver's work it often becomes necessary to enlarge the machine crew. Mounting and dismounting implements can also take too much time and involve certain risks.

To overcome these inconveniences the agricultural machine of the invention is so designed that a main part of said frame extends forward from the region of the driver's station, preferably over said station, and also over the coupling means for the implement.

In this machine the driver will have the implement and the working means thereof close at hand without any parts blocking the view between the driver's station and the implement while he will have a practically unobstructed view in the direction of travel. In a comfortable driving position inside a cabin and without having to turn his body the driver can thus constantly control the operation of the working means and the travelling direction of the machine. The driver may also easily and quickly leave and go back to his station if the implement requires adjustment or other attendance.

The invention will now be described, by way of example, with reference to an embodiment illustrated in the accompanying drawings in which:

FIG. 1 is a side elevation of the agricultural machine of the invention;

FIG. 2 is a plan view of the machine;

FIG. 3 is a rear elevation of the machine; and

FIG. 4 is a side elevation corresponding to that of FIG. 1 showing the machine in position for coupling or uncoupling an implement.

Referring now to the drawings, the machine has a frame 3 supported by driving wheels 1 and by supporting wheels 2 that may also serve as steering wheels for the machine. The driving wheels are associated with a driving unit 4 in a per se known manner. In the embodiment shown a tractor 5 is used for driving the machine, but the steering wheels have been removed from the tractor and are used as supporting wheels 2. However, also other driving units may be used for driving the machine. The driving unit 4 as well as the machine in its entirety is operable from a driver's station 6 the seat 7 of which (FIG. 1) is provided inside a driver's cabin 8. Coupling means, generally designated by 9, for implements, such as e.g. a seeder 10, are arranged between the driving and supporting wheels 1 and 2, respectively.

According to the invention the driver's station 6 is so located in the machine that a main part 11 of the frame 3 extends over the driver's station 6 and consequently on a level, indicated in FIG. 1 by a broken line 12, above the level of the driver's station 6. Said main part 11 is positioned at such a distance from the ground-engaging surface of the wheels 1 and 2 that an adult can stand practically upright under the main part 11 of the frame 3. The driver's station is placed adjacent the side of the driving wheels 1 facing the supporting wheels 2. The seat 7 of the driver's station 6 is positioned on practically the same level as the driving wheel axle 14.

The main part 11 of the frame 3 is preferably in the form of a tubular beam along which a unit 15 including the supporting wheels 2 and the coupling means 9 is slidable and thus adjustable in a direction toward and away from the driver's station 6. The unit 15 is also laterally adjustable in order to permit adapting the machine to the various types of implements to be used in connection with the machine. In the embodiment shown the adjustability longitudinally and transversely of the main part 11 is provided by means of bolt connections 16 which, however, may be replaced by more quick-operated means. The driver's cabin 8 is suspended in a frame part 17 extending between the main part 11 and the axle 14 of the driving wheels 1.

According to the embodiment shown, the unit 15 includes a rectangular frame 18 having an upper horizontal part 19 with which the main part 11 of the frame 3 is adjustably engaged by means of the bolt connections 16, and a lower horizontal part 20 at the ends of which the supporting wheels 2 are mounted. Control means for the unit 15 and its various members, such as the supporting wheels 2 in case these serve as steering wheels for the machine, are suitably drawn from the driver's station 6 up to the unit 15 through the tubular main part 11. Adjacent the vertical parts 21 of the frame 18 and extending along the sides thereof facing the driver's station 6 are a pair of cylinder-piston assemblies 22 which (in a manner not shown) are connected to a hydraulic source and control means in the machine. Each assembly 22 has its cylinder end pivotally connected to a lug 23 in the upper part of the frame 18 and its piston end pivotally connected to one end of a yoke-shaped arm 24 the other end of which is mounted in the lower part of the frame 18. The other ends of the arms 24 are pivotally connected to a three-point lifting frame 25 having hooks 26 to engage the implement 10. In its lower part the lifting frame 25 is provided with a transverse rod 27 mounted in slots 28 in the arms 24 which form the two lower points of the three-point lift. A link 29 has one end pivotally connected to the upper central part of the lifting frame 25 and its other end pivotally connected to a support 30 in the lower part of the rectangular frame 18. Thus, the link 29 forms the third point of the three-point lift. The slots 28 are so oriented in the arms 24 that they are vertical when the arms are in lowered position (working position of the implement). When the arms 24 are lifted the slots 28 will thus be inclined in relation to the vertical plane. This arrangement of the slots has as a result that the rod 27 is vertically movable in the slots when the arms 24 are lowered so that the implement in this position can follow irregularities in the ground. When the implement is raised by means of the three-point lift, which takes place for instance when turnlands are to be passed during operative propulsion of the implement, then the rod 27 rests, under the weight of the lifting frame 25, in the lower ends of the slots 28 which in this position are inclined, and thus the rod is locked in a stable position in the machine by means of the third point and the pivotal connection with the link 29.

At least one lifting means, which in the present case is in the form of a lifting wheel 31, is provided behind the driving wheel 1 under the driver's cabin 8. The wheel 31 is mounted in the end of an arm 32 the other end of which is pivotally mounted in the frame 3. A cylinder-piston assembly 33 is arranged between and pivotally mounted to the arm 32 and a point in the frame 3 above said arm, said assembly being connected to the hydraulic source and control means (not shown) of the machine. The purpose of the wheel 31 is, as appears from FIG. 4, to tilt the frame 3 and, consequently, its main part 11 and the supporting wheels 2 about the axle 14 of the driving wheels 1 to a position raised over the ground such that the machine can be run forward over the implement to permit coupling and uncoupling the implement to and, respectively, from the machine. When the implement has been lowered down to the working position shown in FIG. 1 the orientation is advantageously such that the rod 27 is in a position between the ends of the respective slots 28, which gives the machine and the implement a certain vertical relative movability permitting them to accommodate themselves to differences of level within the working area. This is of great importance because the implements nowadays have a very large working width and, in spite of plain fields, the difference of level may be great between the ends of the implement. In the light of the foregoing description and the drawings it is easily understood that the driver will get a clear view of the working area of the machine and in a comfortable position of driving he can easily follow the operation of the implement and steer the machine perfectly straight in the direction of travel indicated by an arrow 34 in FIG. 1.

What I claim and desire to secure by Letters Patent is:

1. An agricultural machine having a frame, driving wheels and supporting wheels supporting the frame, a driving unit coupled to the driving wheels, a driver's station having means for controlling the driving unit, said frame including a substantially vertical front portion attached to said supporting wheels, a coupling means for agricultural implements fixed to the lower end of the front portion, said coupling means being situated between the supporting wheels and the driving wheels, said frame including a rear portion to which the driving unit and the driving wheels are attached, said driver's station situated forward of the rear portion, said frame having an intermediate portion in the form of a unitary beam having a front end connected to the upper end of the front portion and a rear end rigidly connected to the rear portion above the driver's station.

2. An agricultural machine as claimed in claim 1, having a cabin arranged under the intermediate portion of the frame, said driver's station being located in the cabin.

3. An agricultural machine as claimed in claim 1, wherein the driver's station is located adjacent the driving wheels on the side thereof facing the supporting wheels.

4. An agricultural machine as claimed in claim 3, wherein the driving wheels have an axle, and the driver's station has a seat positioned on practically the same level as the driving wheel axle.

5. An agricultural machine as claimed in claim 1, wherein the supporting wheels and the coupling means together with the front portion of the frame comprise a unit, means connecting the front portion of the frame for lateral movement and for adjustable movement along the intermediate portion of the frame in a direction toward and away from the driver's station, said driver's station being suspended in the rear portion of the frame.

6. An agricultural machine as claimed in claim 5, wherein said unit includes a lifting frame with two yoke-shaped arms movable between a raised position and a lower position by a hydraulic means, each of said arms having one end pivotally attached to the lower part of said front portion of the frame and another end provided with slots, a vertical lifting frame having a horizontal rod extending therefrom, said rod being received in said slots, said slots being vertical when the arms are in the lower position.

7. An agricultural machine as claimed in claim 6, having a link with one end pivotally attached to the upper end of the lifting frame and another end pivotally attached to the front portion of the frame.

8. An agricultural machine having a frame supported by driving wheels and supporting wheels, a driving unit coupled to the driving wheels, said frame comprising a substantially vertical front portion having a lower end to which the supporting wheels are fixed, coupling means for agricultural implements situated between the supporting wheels and the driving wheels, a rear portion of the frame to which the driving unit and the driving wheels are fixed, and an intermediate portion of the frame connecting said front portion and said rear portion, the machine further comprising a lifting device having a further wheel located between said supporting wheels and said driving wheels, power unit means for pressing said further wheel against the ground to swing the machine vertically about the driving wheels, thereby allowing the machine to be driven with the supporting wheels passing over an implement to be coupled or uncoupled on the coupling means.

9. An agricultural machine as claimed in claim 8, wherein said lifting device comprises two swing arms pivotally connected at their rear ends to said rear portion of the frame and provided with said further wheels in their forward ends, said power unit means including at least one hydraulic cylinder piston unit connected to said swing arms for pressing the wheels against the ground when the cylinder piston unit is actuated.

* * * * *